(12) United States Patent
Rapp

(10) Patent No.: US 7,535,632 B2
(45) Date of Patent: May 19, 2009

(54) COMPENSATION OF GAIN VARIATIONS IN A MULTISTAGE OPTICAL AMPLIFIER

(75) Inventor: Lutz Rapp, Deisenhofen (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 247 days.

(21) Appl. No.: 11/666,740

(22) Filed: May 1, 2007

(65) Prior Publication Data
US 2008/0037109 A1  Feb. 14, 2008

(30) Foreign Application Priority Data
Nov. 2, 2004 (DE) ................... 10 2004 052 883

(51) Int. Cl.
*H01S 3/00* (2006.01)
(52) U.S. Cl. .................. 359/341.41; 359/341.43
(58) Field of Classification Search ............ 359/341.41, 359/341.43; 398/160
See application file for complete search history.

(56) References Cited

U.S. PATENT DOCUMENTS 6,064,501 A * 5/2000 Roberts et al. ............. 398/11
6,377,394 B1   4/2002 Drake et al.
2005/0046927 A1   3/2005 Sugaya et al.
2008/0007818 A1 * 1/2008 Onaki et al. ............. 359/337.1

FOREIGN PATENT DOCUMENTS

EP   1 458 065 A1   9/2004

* cited by examiner

*Primary Examiner*—Mark Hellner
(74) *Attorney, Agent, or Firm*—Dickinson Wright, PLLC; Kevin R. Spivak

(57) ABSTRACT

There is described a method for compensation of gain variations in a multistage optical amplifier, for the amplification of an optical wavelength multiplex signal, comprising several amplifier stages in series, each with at least one pumping device. Gain variation occurring after a switching process can easily be compensated for, when the power jump expected at the second amplifier stage is determined and, depending thereon, a new pump power is calculated for the corresponding pump device, the new pump power is set for the pump device before the power jump arrives at the input of the second stage.

20 Claims, 5 Drawing Sheets

COMPENSATION OF GAIN VARIATIONS IN A MULTISTAGE OPTICAL AMPLIFIER

CROSS REFERENCE TO RELATED APPLICATIONS

This application is the US National Stage of International Application No. PCT/EP2005/055189, filed Oct. 12, 2005 and claims the benefit thereof. The International Application claims the benefits of German application No. 10 2004 052 883.7 DE filed Nov. 2, 2004, both of the applications are incorporated by reference herein in their entirety.

FIELD OF INVENTION

The invention relates to a method for compensating variations in gain in a multistage optical amplifier according to the preamble of claim 1 and to an appropriately set-up optical amplifier according to the preamble of claim 5.

BACKGROUND OF INVENTION

Optical amplifiers are employed in the field of optical transmission technology for amplifying the optical signals transmitted in an optical network. Said optical signals in many cases run over long links measuring several hundred kilometers and more in an optical fiber, being attenuated in the process. It is therefore necessary to amplify the optical signals when they have been transmitted over long links.

FIG. 1 is a schematic diagram of a typical optical transmission link, or a part of a transmission network, having a transmitter 1 (TX), a receiver 9 (RX), and two amplifiers 3. An optical signal emitted by the transmitter 1 therein runs over a plurality of sections of an optical fiber 2 to the receiver 9 and is in each case after a predefined link amplified or refreshed by an amplifier 3.

SUMMARY OF INVENTION

Optical links and networks of said type frequently employ Wavelength Division Multiplexing (WDM), a technique whereby a plurality of channels—as a rule 40 or 80 are transmitted in an optical fiber 2 simultaneously. The information is therein modulated on a carrier wavelength of the respective channel for example at 10 Gbps. WDM furthermore offers the possibility of linking distributed transmitters and receivers directly over optical paths without the need for opto-electric conversion at the nodal points.

A known optical-amplifier type operates using an erbium-doped fiber into which the light from an optical pump, for example a laser diode, is coupled. The optical signal ducted in the doped fiber is therein amplified by means of stimulated photon emission. Used also alongside the erbium-doped fibers are, for example, amplifier stages, whose fibers are doped with other rare-earth ions, semiconductor amplifiers, or Raman amplifiers.

FIG. 2 shows a typical amplifier stage 4 of an optical amplifier 3 that uses an erbium-doped fiber 14. The amplifier stage further includes a WDM coupler 10 and an optical pump 11 whose light is coupled via the WDM coupler 10 into the doped fiber 14. The WDM signal (comprising, for instance, 80 channels) ducted in the optical fiber 2 is amplified in the doped fiber 14 through spontaneous emission. The amplifier gain is dependent on the pumping power of the pump 11 and is set by a control device (not shown) as required.

The addition and removal or coupling and decoupling of individual channels of the WDM signal being transmitted on the fiber 2 results in abrupt changes in power at the input of the amplifier 3. The pumping power of the pump 11 has to be quickly matched to different input powers. The amplifier gain (defined as the output power/input power) would otherwise change and the output power increase or decrease more than proportionally, as a consequence of which bit errors may occur at the receiver 4. Particularly in the case of multistage amplifiers the deviations in gain in the individual stages can accumulate so that bit errors can very readily occur. A critical factor in the development of an optical amplifier is hence to maintain as constant as possible an amplifier gain even when large abrupt changes in power occur at the amplifier input.

A whole host of methods are known from the prior art whereby the amplifier gain can be kept substantially constant when there is a change in input power. One known method measures, for example, the change in input power and, as a function thereof, calculates a new pumping power that will be set on the pump immediately thereafter. The main difficulty with this lies in calculating the new pumping power correctly so that the amplifier gain will remain substantially constant. The pumping power is dependent not only on the amplifier's input power but also on the other channels' wavelength after the switching operation, and on other influencing variables. Basing the calculation of the pumping power requiring to be newly set solely on the change in power at the input is thus relatively imprecise.

Other known methods regulate the amplifier gain or, as the case may be, the amplifier output power in a closed control loop, with the optical pump forming the control element for regulating. During the settling time in regulating there are undesired transients in the amplifier gain here also, which can give rise to transmission errors.

Variations (overshooting or undershooting) in the amplifier gain will, though, also occur after a switching operation even when the pumping power is optimally matched to a changed input power (which is to say is changed to the correct value in a single step). Said variations are due to the memory effect of the doping element in the fiber 14. The electrons in the doping element (erbium, for example) are, by means of optical pumps, first raised to a first higher energy level from which they drop, in a non-emitting state transition, to a second, lower energy level. An emitting state does not occur until a transition is then made from the second energy level to a third energy level. There will always still be many electrons at said first level when the pumping power is reduced abruptly, and these will later contribute to an (undesired) brief increase in signal power or, as the case may be, amplifier gain. Said increase can be detected as an overshoot in the output power or, as the case may be, amplifier gain which, especially in the case of multistage amplifiers, can result in bit errors in the receiver through accumulation.

FIG. 3 shows the overshoot 23 after a switching operation in the output signal $P_{sig,out}$ and in the gain G of an amplifier stage 4. The top graph therein shows the curve of the cumulative input power $P_{sig,in}$ of an optical signal having, for example, 80 channels that is being applied to the input of the amplifier stage. For example 40 of the 80 channels are decoupled from the amplifier, as a result of which the power at the input abruptly drops. The abrupt change in power 20 is present at the input of the amplifier stage 4 at the instant to.

The second graph shows the curve of the pumping power $P_P$. As can be seen, the pumping power $P_P$ is likewise abruptly reduced shortly after the instant $t_0$ in response to the abrupt change in power 20. The third graph shows the output power $P_{sig,out}$ of the amplifier stage, which likewise displays an abrupt change 22 approximately at the instant $t_0$. The bottom graph shows the gain G of the amplifier stage 4, which gain likewise contains the overshoot 23. (There would be analogous undershooting were channels added).

In the case of optical amplifiers having a plurality of amplifier stages connected in series one behind the other, the overshoots 23 or, as the case may be, undershoots will be added, as a result of which relatively large power variations that can again result in bit errors in the receiver may occur at the optical amplifier's output.

An object of the present invention is therefore to compensate or at least considerably reduce said kind of variations in an optical amplifier's gain, particularly overshooting or undershooting occurring after a switching operation.

Said object is achieved according to the invention by means of the features indicated in independent claims. Further embodiments of the invention are the subject of subclaims.

A principal notion underlying the invention is to at least partially compensate a variation (overshooting or undershooting) occurring in a first amplifier stage's amplifier gain following an abrupt change in power in said amplifier stage's input signal by changing the pumping power of a succeeding second stage even before the abrupt change in power is present at the second stage's input. The pumping power at the second stage is therein changed so soon that the variation (for example overshooting) in the second stage's input signal will be compensated by a counter variation (for example undershooting that would otherwise occur in the gain of the second stage). A multistage optical amplifier's gain after a switching operation can in that way be kept substantially constant and variations in gain compensated.

For implementing said method it is necessary on the one hand to determine the magnitude of the abrupt change in power to be expected at the second amplifier stage and, on the other, to know the instant at which the abrupt change in power will be present at the second stage's input. The second stage's new pumping power is calculated preferably as a function of the future input power or, as the case may be, the change in the input power and set a predefined period of time (derivative time) before the change in power occurs at the second stage's input. The optimal derivative time is therein determined by the amplifier's structure and can be ascertained through, say, testing or simulating.

The new pumping power at the second amplifier stage is set preferably as part of a control operation. Although no provision has been made for regulating the output power or, as the case may be, gain, that can also be implemented where applicable.

In order to keep the first amplifier stage's amplifier gain constant after a switching operation (meaning after channels have been added or removed), it is necessary, as mentioned in the introduction, to match the associated pumping power. Many methods are known for that. According to the invention the first stage's pumping power is set preferably using a method whereby the first stage's output power is measured before and after the abrupt change in power and the new pumping power calculated therefrom according to a predefined algorithm. Said method has already been described in an earlier patent application submitted by the company Siemens AG entitled "Verbesserte Feed Forward Regelung von Erbium dotierten Faser-Verstärkern zur Unterdrückung von Transienten"(Improved feed-forward regulating of erbium-doped fiber amplifiers for suppressing transients). The new pumping power can in that way be calculated so precisely that the first amplifier stage's gain (except for succeeding overshooting or undershooting) will remain substantially constant. The calculation is based on the knowledge that an amplifier stage's gain remains substantially constant during the first microseconds after a switching operation even with the pumping power unchanged. The output power measured immediately after a switching operation thus constitutes a desired output power to which the pumping power has to be matched. The new pumping power can thus be measured with a high degree of accuracy based on the output power measured immediately after a switching operation. The calculation takes a wavelength dependency of the amplification into account. It is therefore irrelevant which channels are added or removed.

The pumping power requiring to be newly set at the second amplifier stage is, as mentioned, calculated as a function of the magnitude of the change in power to be expected at the input of the second amplifier stage. The abrupt change in power to be expected can be determined from, for example, the measured change in power at the first stage's output, taking the attenuation between the two stages into account.

The instant at which the pumping power is changed is dependent on the magnitude of the variation in the first amplifier stage's output signal and on the structure of the amplifier itself. The optimal derivative time can be ascertained through, say, testing or simulating. The magnitude of the overshoot (or undershoot) could, for example, optionally also be measured and the derivative time calculated as a function of said magnitude.

The second stage's pumping power is according to a preferred embodiment changed not just once during a switching operation but at least twice. At a first step the pumping power is, as mentioned, changed a predefined period of time before the change in power occurs and, at a second step, corrected preferably immediately after the abrupt change in power has occurred at the input of the second amplifier stage. Second matching or correcting of the pumping power is performed preferably based on the measured output power before and after the abrupt change in power, as was described above with reference to the first amplifier stage. The amplification's wavelength dependency can thereby again be taken into account and the amplifier stage's gain kept constant.

A multistage optical amplifier, appropriately set up for performing the above-described method, includes at least one first and one second amplifier stage each having at least one optical pump.

Sensors such as, for example, optical diodes are preferably provided at the inputs and/or outputs of the amplifier stages for determining the input and/or output power. The power sensors and pumping devices are connected to a control device which is set up for compensating variations in the amplifier gain (overshooting or undershooting) that follow an abrupt change in power at the input and contains a corresponding algorithm. When there is an abrupt change in power at the amplifier's input, the control device will determine the change in power to be expected at the second amplifier stage's input and, as a function thereof, calculate a new pumping power for the second stage. The new pumping power will therein be set on the associated pump even before the abrupt change in power is present at the second stage's input.

The control device preferably also calculates a second, corrected value for the pumping power of the second stage, which value is set on the associated pump immediately after the abrupt change in power has arrived at the second stage's input. The corrected value is calculated preferably as a function of the second stage's output power after the abrupt change in power.

Located between the two amplifier stages is preferably a propagation-prone element such as, for example, a dispersion-compensating fiber (DCF fiber). Said element's propagation delay will enable the new pumping power of the second stage to be calculated in a timely fashion before the abrupt change in power has arrived at the second stage's input.

BRIEF DESCRIPTION OF THE DRAWINGS

The invention is explained by way of example in more detail below with the aid of the attached drawings.

DETAILED DESCRIPTION OF INVENTION

Figure 1:
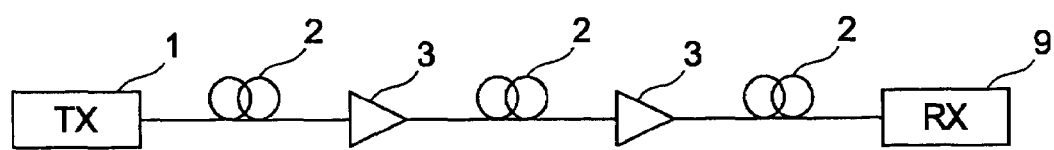
FIG. 1 is a schematic diagram of a simple optical system, or part of an optical network, having a plurality of amplifiers.
Figure 2:
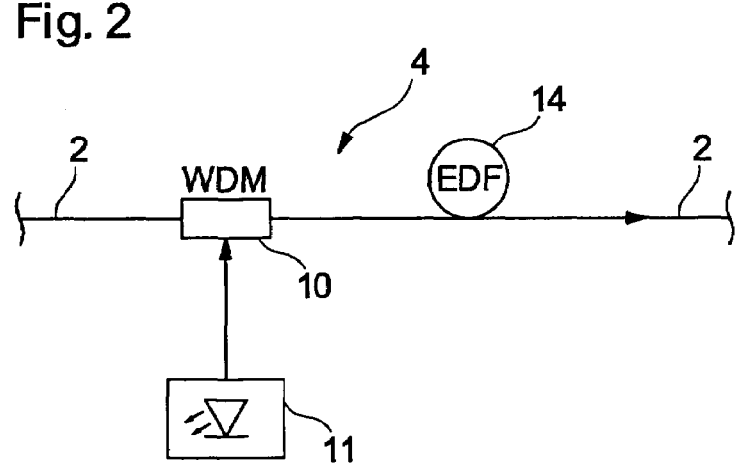
FIG. 2 is a schematic view of an amplifier stage of an optical amplifier having an erbium-doped fiber.
Figure 3:
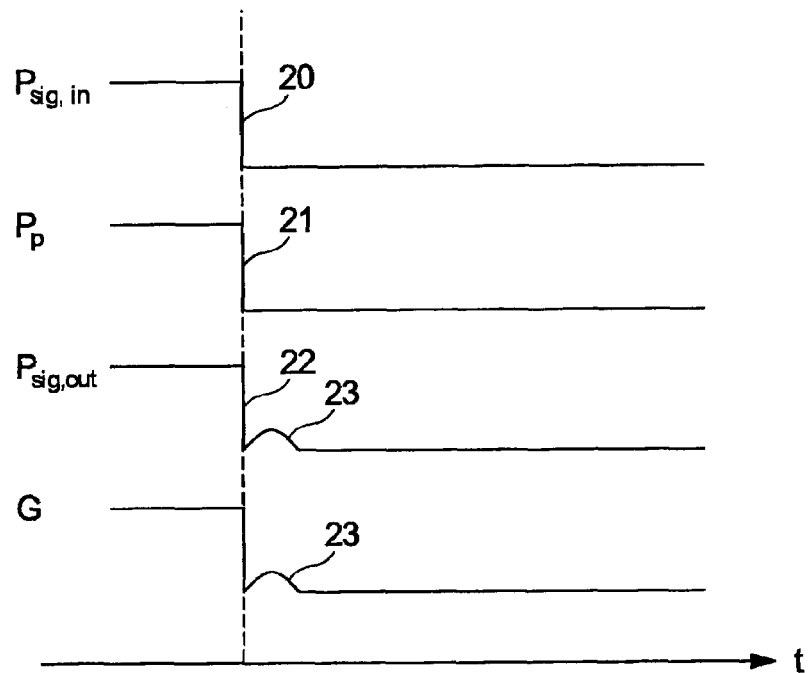
FIG. 3 shows a switching operation on an amplifier stage of an optical amplifier.

As regards the explanation of FIGS. 1 to 3, reference is made to the introduction to the description.

Figure 4:
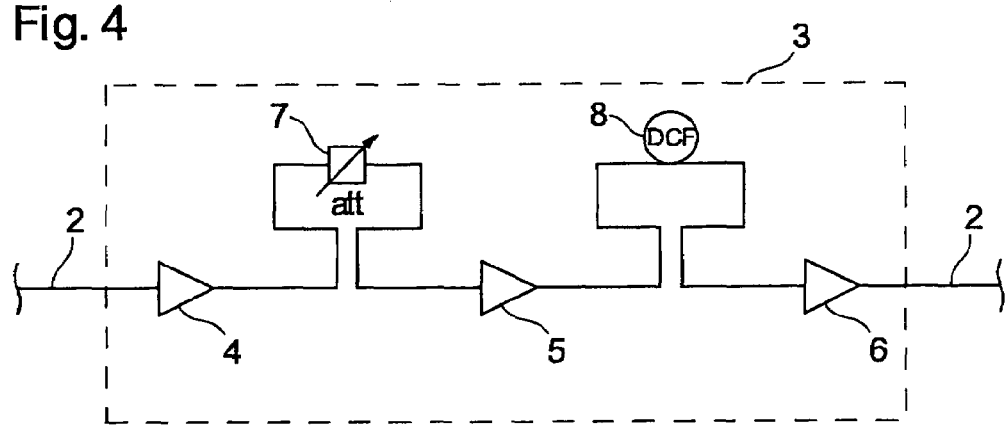
FIG. 4 shows an embodiment of a three-stage optical amplifier.

FIG. 4 shows a three-stage optical amplifier 3 having the amplifier stages 4, 5, and 6. Located between the amplifier stages 4 and 5 is a variable attenuator 7 by means of which the gain of the amplifier 3 can be varied.

Connected between the stages 5 and 6 is a dispersion-compensating fiber 8 (DCF) serving to compensate a dispersion, which is to say the variation in group speed as a function of frequency, of individual channels. Fibers of said type are usually several kilometers in length and wound into a packet connected between two amplifier stages. Owing to its length, the DCF fiber causes a certain signal delay, which is of significance here.

Connected to the input and output of the optical amplifier 3 is an optical fiber 2 on which is ducted an optical WDM signal having, for example, 80 channels. The individual amplifier stages 4-6 are in the present exemplary embodiment each structured according to FIG. 2 and operate using an erbium-doped fiber 14 excited by an optical pump 11.

Figure 5:
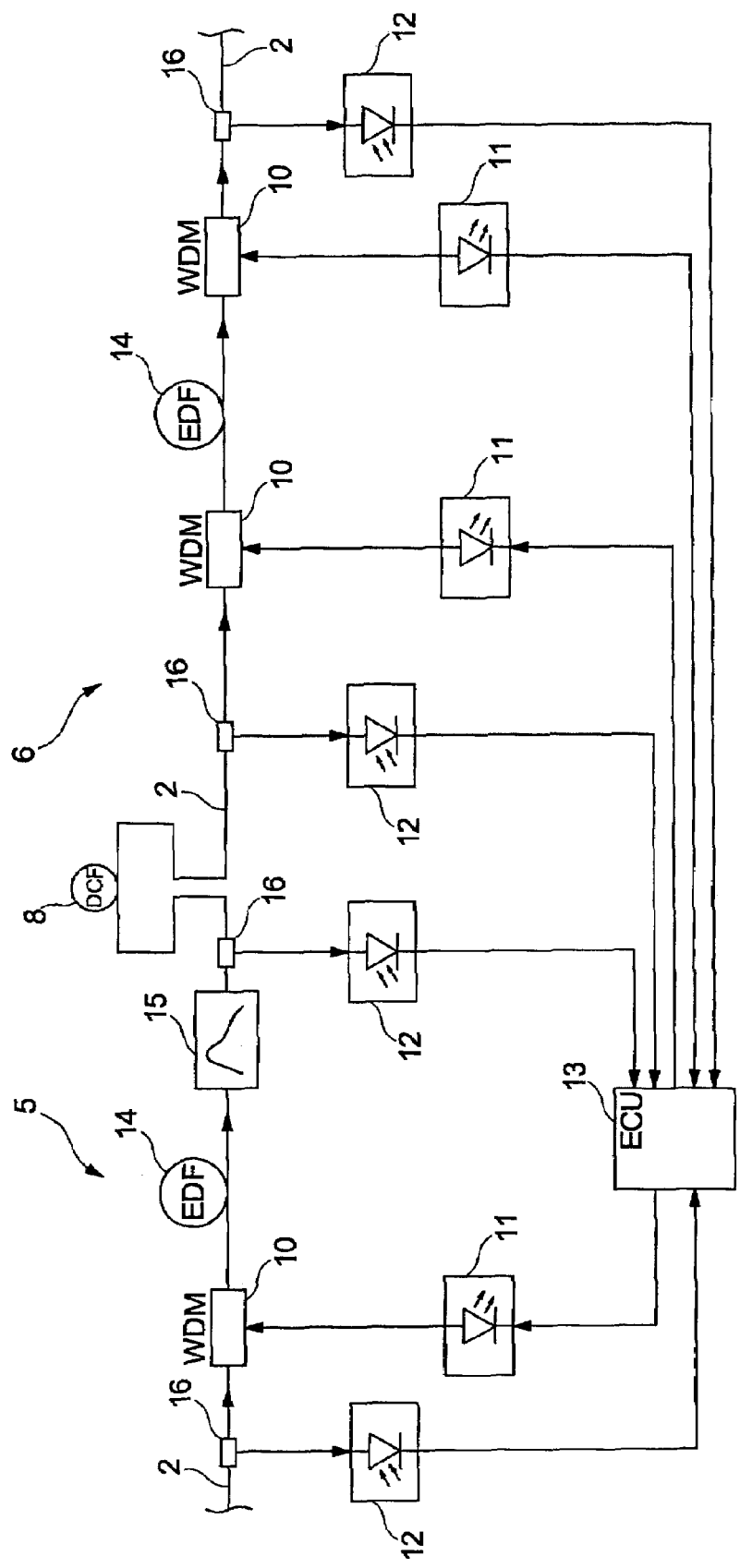
FIG. 5 is a detailed view of two amplifier stages of the amplifier shown in FIG. 4.

FIG. 5 is a detailed view of the amplifier stages 5 and 6 of the multistage optical amplifier shown in FIG. 4. The amplifier stages 5 and 6 each include an erbium-doped fiber 14 which in the case of the amplifier stage 5 is excited by one and, in the case of the amplifier stage 6, two pumping device (s) 11 such as, for example, pumping diodes. The light produced by the pumping devices 11 is coupled in a known manner via WDM couplers 10 into the EDF fiber 14. The result there is a stimulated emission of light quanta and hence an amplification of the optical WDM signal being ducted in the fiber 2.

The two amplifier stages 5 and 6 each further include a sensor such as, for example, a photodiode located at said stages' input and output for measuring the input or, as the case may be, output power of the stages 5 and 6. The sensors 12 are each connected to the main fiber 2 via a coupling element 16 by means of which a part of the light signal ducted on the fiber 2 is decoupled. The sensors 12 are connected to a control unit 13 and duct the current power values thereto. The first amplifier stage 5 further includes a smoothing filter 15 located downstream of the EDF fiber 14 for smoothing the amplifier gain G over the individual channels.

The pumping devices 11 are likewise connected to the control unit 13. When a switching operation takes place in the optical signal, the pumping power $P_p$ is changed accordingly to match it to the change in power and thereby keep the gain of the amplifier 3 substantially constant. The pumping powers $P_P$ are therein matched by a control means (no regulating means is provided here).

Figure 6:
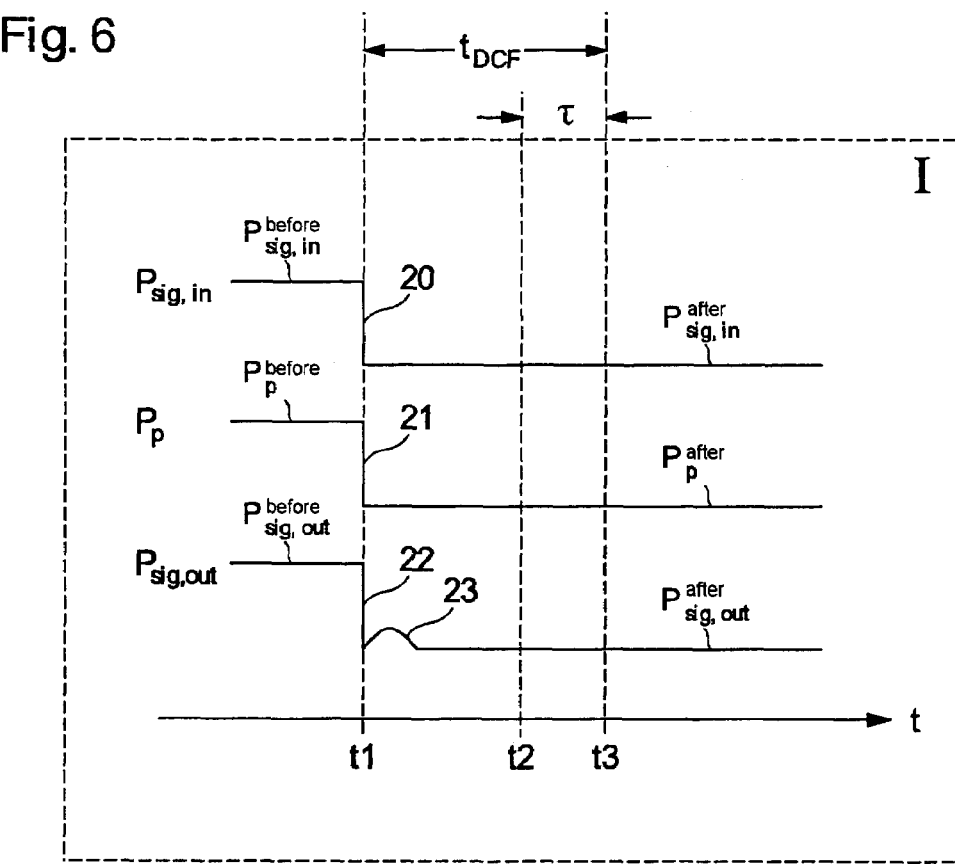
FIG. 6 shows the curve of the input, output, and pumping power at a first and a second amplifier stage.
Figure 6:
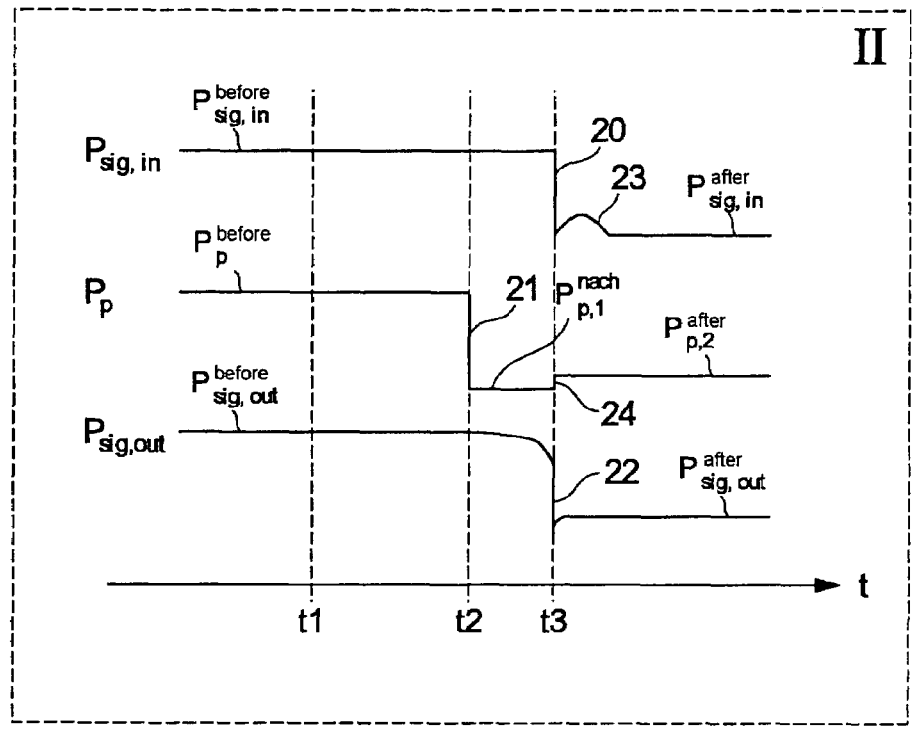

The pumping power $P_P$ is controlled in a special manner so that the amplifier gain G can be kept substantially constant after a switching operation. That is explained below with the aid of FIG. 6:

FIG. 6 shows the curve of the input powers $P_{sig,in}$ or, as the case may be, output powers $P_{sig,out}$ as well as the pumping powers $P_P$ for the first and second amplifier stage 5, 6 for an exemplary switching operation during which 40 channels are switched off from originally, for example, 80 channels. (Although actually forming the second and third amplifier stage of the multistage optical amplifier 3 shown in FIG. 4, the amplifier stages 5 and 6 are here, as also in the claims, designated as the first and second amplifier stage 5, 6. The amplifier stage 6 also has to compensate overshooting occurring in the amplifier stages 4 and 5. The influence of the stage 4 has, though, for simplicity's sake been ignored here. The expansion for taking account of said stage will emerge in an obvious manner from the description below.)

Removing or decoupling the 40 channels results in an abrupt change 20 in the input power $P_{sig,in}^{I}$ in which at the instant $t_1$ is present at the input of the first amplifier stage 5.

The signal and pumping powers before the switching event are indicated by the superscripted index "before" and those after the switching event by the superscripted index "after".

The pumping power $P_P^{I}$ of the first amplifier stage 5 is matched shortly after the switching event 20 to the lower input power $P_{sig,in}^{I}$ in order not to change the gain of the first amplifier stage 5. Although a whole host of control or regulating methods are known for this, especially precise matching of the pumping power $P_P^{I}$ can be achieved using a method whereby the output power $P_{sig,out}^{after,I}$ is measured immediately after the switching event 22 and the pumping power $P_P^{after,I}$ requiring to be newly set is calculated based on said output power. The new pumping power $P_P^{after,I}$ follows from an effective pumping power $P_{eff}^{after}$, to which the following applies:

$$P_{eff}^{after} = P_{eff}^{before} + \frac{\overline{\lambda}_{sig}}{\lambda_P} \cdot \frac{1}{G_{stand}} \cdot \{P_{sig,out}^{after,I} - P_{sig,in}^{after,I} - P_{sig,out}^{before,I} + P_{sig,in}^{before,I}\} \quad (1)$$

where $P_{sig,out}^{after,I}$ is the cumulative output power after the switching event, $P_{sig,out}^{after,I}$ is the cumulative input power after the switching event, $P_{sig,out}^{before,I}$ is the cumulative output power before the switching operation, and $P_{sig,in}^{before,I}$ is the cumulative input power before the switching operation.

The following therein applies to the effective pumping power before the switching event 20:

$$P_{eff}^{before,I} = P_0 \cdot \ln\left\{1 + \frac{P_P^{before,I}}{P_0}\right\} \quad (2)$$

The individual cumulative powers are measured using the sensors 12. The two wavelengths $\bar{\lambda}_{sig}$ and $\bar{\lambda}_p$ stand for the mean signal wavelength after the switching operation or, as the case may be, the pumping wavelength.

The new pumping power $P_P^{after,I}$ finally follows from the effective pumping power $P_{eff}^{after,I}$ as $$P_P^{after,I} = P_0 \cdot \left[ \exp\left\{ \frac{P_{eff}^{before,I}}{P_0} \right\} - 1 \right] \quad (3)$$

where $P_0$ is a constant.

This calculation model is based on there being no change in the amplifier stage's gain during the first few microseconds after the switching event 20 even with the pumping power $P_P$ remaining the same. The output power $P_{sig,out}^{I}$ set immediately after the switching event is thus the output power according to which the new pumping power $P_P^{after,I}$ is to be set.

Regardless of which method was selected for matching the pumping power $P_P$ of the first stage 5, variations (overshooting 23 or analogous undershooting) that can result in bit errors at the receiver 4 usually occur in the output signal $P_{sig,out}$ or, as the case may be, gain G of the amplifier stage 5 after a switching event 20. Said variations cannot be eliminated even if the new pumping power $P_P^{after,I}$ is set very quickly and optimally as they are physically due to the memory effect, described in the introduction, in the doping material of the doped fiber 14. They can, though, be compensated or substantially reduced by prematurely reducing the pumping power at the second amplifier stage 6. The process of matching the second stage's pumping power $P_P^{II}$ is therein preferably as follows:

After a switching event 20 at the first stage 5, the change in power to be expected at the input of the second stage 6 is first calculated at a first step. Said change in power follows from the change in power $P_{sig,out}^{after,I} - P_{sig,out}^{before,I}$ measured at the output of the first stage 5 that is multiplied by an attenuation factor of $10^{-a/10}$ of the DCF fiber 8.

A new effective pumping power $P_{eff}^{after,II}$ is then calculated to which applies:

$$P_{eff}^{after,II} = P_{eff}^{before,II} + \frac{\bar{\lambda}_{sig}}{\lambda_P} \cdot \frac{G_{stand}^{before,II} - 1}{G_{stand}} \cdot \left\{ P_{sig,out}^{after,I} - P_{sig,out}^{before,I} \right\} \cdot 10^{-a/10} \quad (4)$$

where $G_{stand}$ is a standard parameter for the gain and $G_{sig}^{before,II}$ is the gain of the second stage 6 before the switching event 20 at the input of the second stage 6. The new pumping power $P_{P,1}^{after,II}$ is then in turn calculated therefrom according to equation (3).

In contrast to the first stage 5, the new pumping power $P_{P,1}^{after,II}$ is set not after a switching event 20 has occurred but already a predefined period of time (derivative time τ) before the switching event 20 has occurred at the input of the second stage 6. The derivative time τ is therein selected such that the overshoot 23 will be substantially compensated (by an undershoot otherwise contained in the output signal $P_{sig,out}^{II}$ of the second stage 6). The output power $P_{sig,in}^{II}$, and hence also the amplifier stage's gain, will change only slightly during the derivative time.

The length of the derivative time τ is dependent on the magnitude of the overshoot 23. The optimal derivative time r can be ascertained through, for example, testing provided identical overshoots 23 or, as the case may be, undershoots only ever occur in the input power $P_{sigmin}^{II}$. The optimal derivative time could otherwise be ascertained also by, for example, measuring and matched to the respective case.

The pumping power $P_P^{II}$ is usually dependent not only on the input power $P_{sig,in}^{II}$ but also to a certain extent on the transmitted channels' wavelength. It thus makes a difference for the gain of the stage 5, 6, for example, whether the ten channels having the highest frequency or the ten channels having the lowest frequency are removed. To take account of this wavelength dependency of the gain, the pumping power $P_P^{II}$ is preferably further corrected after the change in power 20 has occurred at the input of the second stage 6. The corrected pumping power $P_{P,2}^{after,II}$ can be calculated, for example, once again based on the change in output power $P_{sig,out}$ as was described above with reference to the first stage 5. For example the following relationship can be formulated for the corrected effective pumping power $P_{eff,2}^{after,II}$:

$$P_{eff,2}^{after,II} = P_{eff}^{before,II} + \frac{\bar{\lambda}_{sig}}{\lambda_P} \cdot \frac{G_{stand}^{after,II} - 1}{G_{stand}} \cdot \left\{ P_{sig,out}^{after,I} - P_{sig,out}^{before,I} \right\} \cdot 10^{-a/10} \quad (5)$$

where $$G_{sig}^{after,II} = G_{sig}^{before} \frac{G_{sig}^{trans,after}}{G_{sig}^{trans,before}} \quad (6)$$

$G_{sig}^{trans,before}$ and $G_{sig}^{trans,after}$ are therein the gain values of the second stage 6 before and after the change in power 20. Account is taken by means of the gain value $G_{sig}^{after,II}$ of the gain's already having changed starting at the instant $t_2$ of the reduction in the pumping power $P_P^{II}$. The pumping power $P_{P,2}^{after,II}$ actually requiring to be set can in turn be calculated from the corrected effective pumping power $P_{eff,2}^{after,II}$.

If instead of an overshoot 23 an undershoot (not shown), for example, is set in the output signal $P_{sig,out}^{I}$ of the first stage 5, as can happen when, for instance, a plurality of channels are added, then what was said above will apply to matching of the pumping power at the second stage 6 except that the pumping power $P_P^{II}$ of the second stage 6 will be increased prematurely.

Correcting of the pumping power $P_{P,2}^{after,II}$ at the instant $t_3$ can be carried out but does not have to be.

Figure 7:
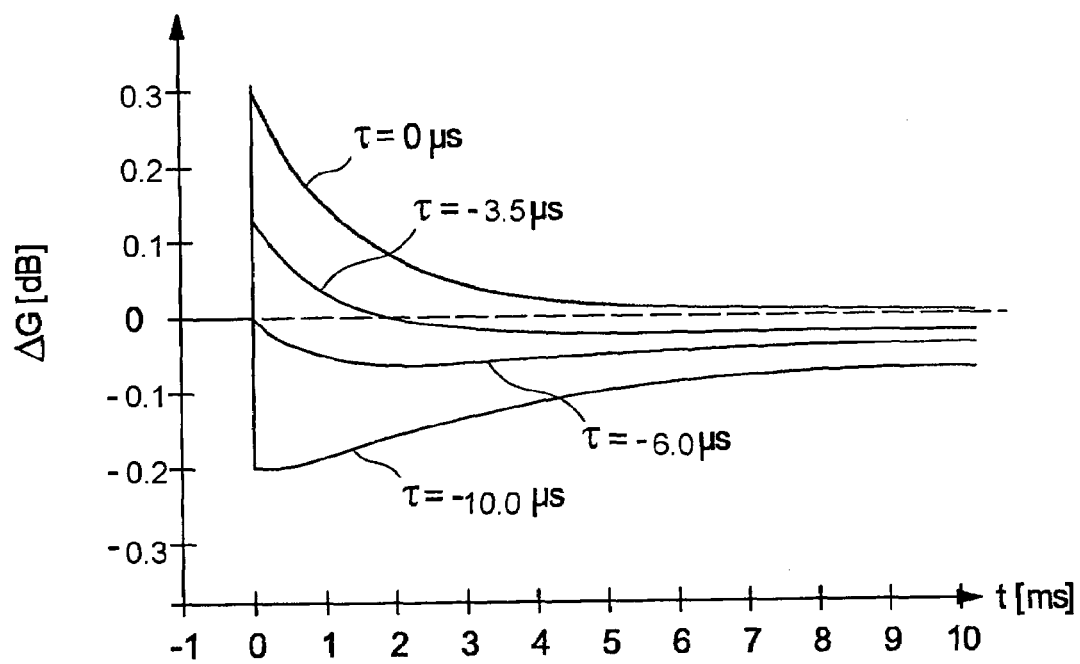
FIG. 7 shows an amplifier's gain deviation for different derivative times.

FIG. 7 shows the gain deviation in dB of the amplifier 3 for different derivative times τ. It can be seen therein that the gain for derivative times between −3.5 μs and 6 μs changes the least, with only minimal undershooting occurring.

The invention claimed is:

1. A method for compensating a variation in gain in an optical amplifier for amplifying an optical Wavelength Division Multiplexing signal, comprising:
   providing a plurality of series-connected amplifier stages with at least two pumping devices;
   adjusting a pumping power of the pumping devices to keep a amplifier gain essentially constant when an abrupt change of an input power occurs;
   adjusting the pumping power of a first amplifier stage when the abrupt change in the input power occurs;
   determining an expected change in the input power at a succeeding second amplifier stage;
   determining a new pumping power for the pumping device associated to a second amplifier stage based upon the determined expected change in the input power at the second amplifier stage; and adjusting the new pumping power for the second amplifier stage based upon a derivative time before the abrupt change in power occurs at the input of the second stage.

2. The method as claimed in claim 1, wherein the abrupt change is based upon an event selected from the group consisting of:
adding a channel of the WDM signal transmitted,
removing a channel of the WDM signal transmitted,
coupling a channel of the WDM signal transmitted, and
decoupling a channel of the WDM signal transmitted.

3. The method as claimed in claim 2, wherein a output power of the second amplifier stage is determined after the abrupt change in power has occurred at the input of the second amplifier stage.

4. The method as claimed in claim 2, wherein the output power of the second amplifier stage is determined immediately after the abrupt change in power has occurred at the input of the second amplifier stage.

5. The method as claimed in claim 3, wherein a new pumping power of the pumping device associated to the second amplifier stage is calculated based upon the output power of the second amplifier stage.

6. The method as claimed in claim 5, wherein the new pumping power is set.

7. The method as claimed in claim 1, wherein the output power of the first amplifier stage is determined immediately after the abrupt change in power at the input of the first amplifier stage.

8. The method as claimed in claim 1, wherein the output power of the first amplifier stage is determined after the abrupt change in power at the input of the first amplifier stage.

9. The method as claimed in claim 8, wherein a new pumping power for the pumping device associated with the first amplifier stage is calculated based upon the determined output power of the first amplifier stage.

10. The method as claimed in claim 6, wherein the output power of the first amplifier stage is determined after the abrupt change in power at an input of the first amplifier stage.

11. The method as claimed in claim 10, wherein a new pumping power for the pumping device associated with the first amplifier stage is calculated based upon the determined output power of the first amplifier stage.

12. The method as claimed in claim 1, wherein the pumping power of the second amplifier stage is adjusted based upon a control operation.

13. A multistage optical amplifier to amplify an optical Wavelength Division Multiplexing signal, comprising:
a plurality of series-connected amplifier stages with at least two pumping devices;
a sensor for determining a power of the amplifier stages;
a control unit to monitor the signal power of the Wavelength Division Multiplexing signal and to adjust the pumping power of at least one of the pumping devices in respect to an abrupt change in an input power to the multistage optical amplifier to keep an amplifier gain essentially constant;
a first amplifier stage, wherein a pumping power of the first amplifier stage is changed via the control unit in response to the abrupt change in input power;
a second amplifier stage, wherein the control unit determines an expected abrupt change in power at an input of a second amplifier stage;
a new pumping power value for a pumping device associated to the second amplifier stage based upon the determined expected change in power at an input of the second amplifier stage; and
a derivative time to set the new pumping power value before the abrupt change in power occurs at the input of the second amplifier stage.

14. The multistage optical amplifier as claimed in claim 13, wherein the change in power is compensated based upon a counter variation.

15. The multistage optical amplifier as claimed in claim 13, wherein the sensor determines an input power.

16. The multistage optical amplifier as claimed in claim 13, wherein the sensor determines an output power.

17. The multistage optical amplifier as claimed in claim 13, wherein each of the amplifier stages has an erbium-doped fiber.

18. The multistage optical amplifier as claimed in claim 13, wherein a dispersion-compensating fiber is located between the first amplifier stage and the second amplifier stage.

19. The multistage optical amplifier as claimed in claim 13, wherein the control device controls the pumping power and wherein the amplifier has no closed loop control to control the amplifier gain.

20. The multistage optical amplifier as claimed in claim 13, wherein the multistage optical amplifier has three amplifier stages.

* * * * *